United States Patent [19]

van der Lely

[11] 3,920,079

[45] Nov. 18, 1975

[54] SOIL CULTIVATING IMPLEMENTS OR ROTARY HARROWS

[76] Inventor: Cornelis van der Lely, 7 Bruschenrain, Zug, Switzerland

[22] Filed: Dec. 3, 1973

[21] Appl. No.: 421,436

[30] Foreign Application Priority Data
Feb. 4, 1972  Netherlands.................... 7216409
Dec. 20, 1972  Netherlands.................... 7217348

[52] U.S. Cl.................................. 172/59; 172/111
[51] Int. Cl.²........................................ A01B 33/06
[58] Field of Search............................ 172/47–49, 172/52, 59, 110, 111, 169, 522–526, 713, 719, 747; 37/142 R, 142 A; 175/410

[56] References Cited
UNITED STATES PATENTS

| | | | |
|---|---|---|---|
| 113,141 | 3/1871 | Chase | 172/526 |
| 134,137 | 12/1872 | France | 172/747 |
| 623,645 | 4/1899 | Young | 172/713 |
| 783,296 | 2/1905 | Miles | 172/747 |
| 1,960,879 | 5/1934 | Russell et al. | 172/713 |
| 2,110,790 | 3/1938 | Daugherty et al. | 172/59 |
| 2,606,413 | 8/1952 | Gray | 172/713 |
| 3,092,052 | 6/1963 | Andersen | 172/713 X |
| 3,616,862 | 11/1971 | van der Lely | 172/47 |
| 3,774,687 | 11/1973 | van der Lely | 172/59 X |
| 3,774,689 | 11/1973 | van der Lely et al. | 172/522 X |

FOREIGN PATENTS OR APPLICATIONS

| | | | |
|---|---|---|---|
| 571,978 | 2/1924 | France | 172/719 |
| 29,997 | 12/1898 | United Kingdom | 172/49 |
| 247,929 | 4/1947 | Switzerland | 172/49 |

Primary Examiner—Edgar S. Burr
Assistant Examiner—Paul T. Sewell
Attorney, Agent, or Firm—Mason, Mason & Albright

[57] ABSTRACT

A cultivating implement has rotatable soil working members including a generally horizontal support and downwardly extending tines. The support has means for fastening same to an upwardly extending shaft and the support together with the tines can be of a single piece of material made by casting, forging or swaging. The soil working portion of each tine is straight and has a wear resistant element extending along its leading side with respect to the direction of normal rotation through the soil. The wear resistant element can be a hardened rib, an insert or a tapering socket-like element that surrounds the soil working portions of the tines.

4 Claims, 12 Drawing Figures

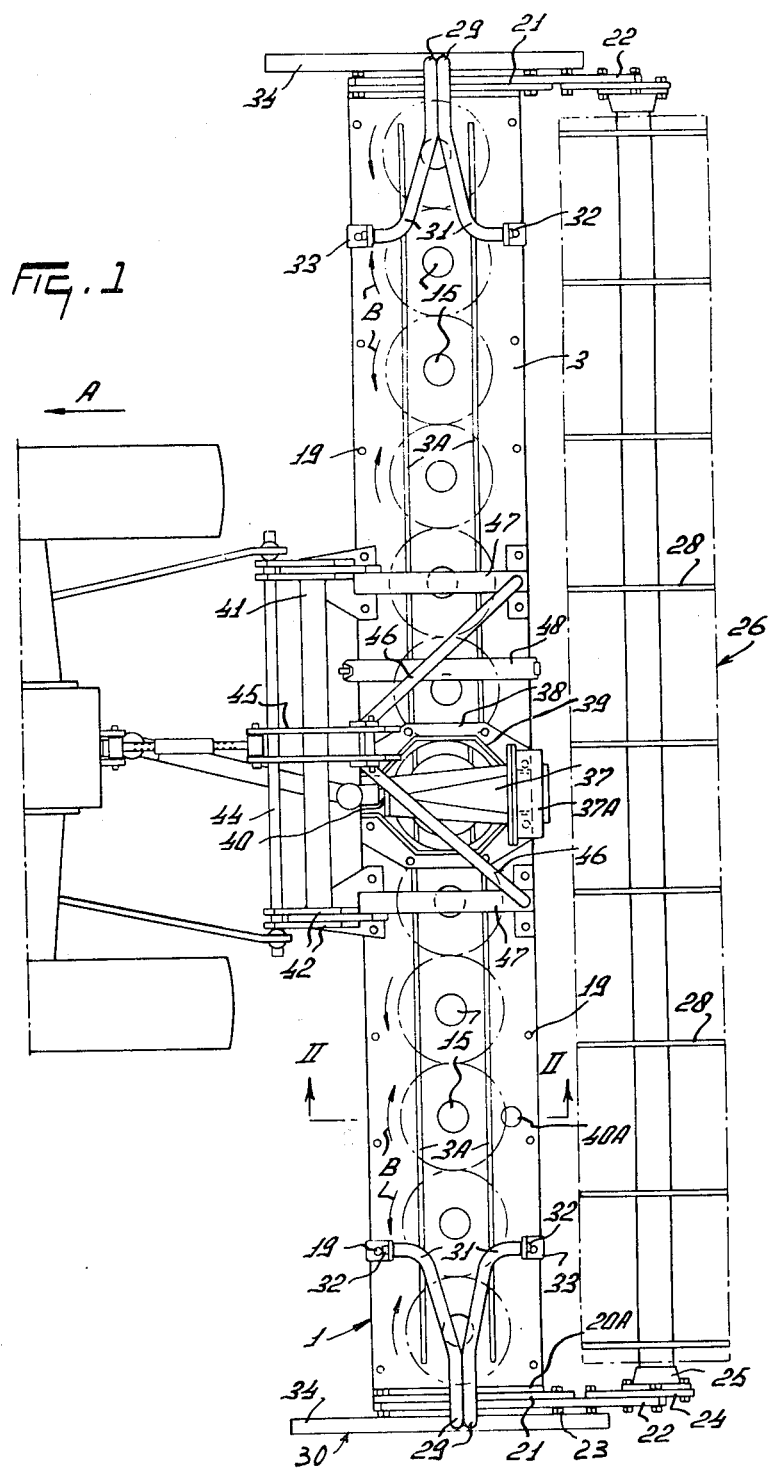

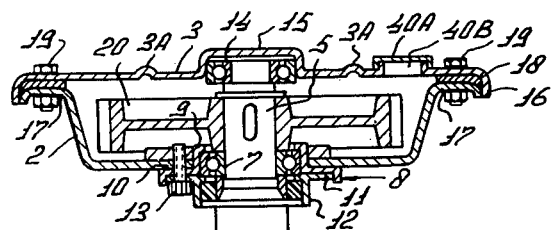
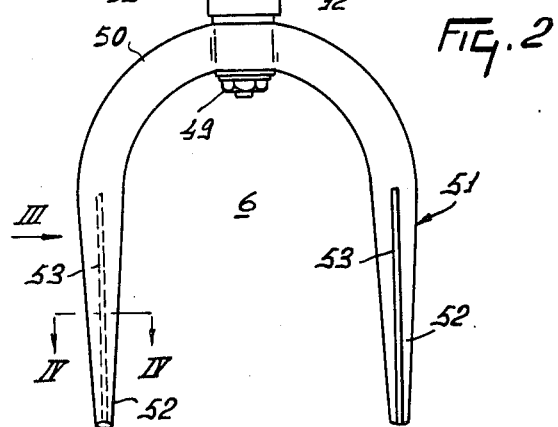
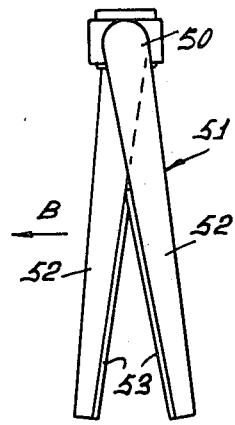
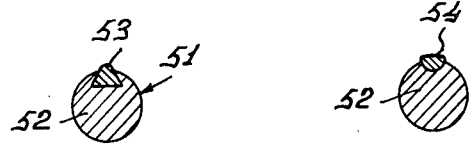
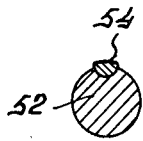
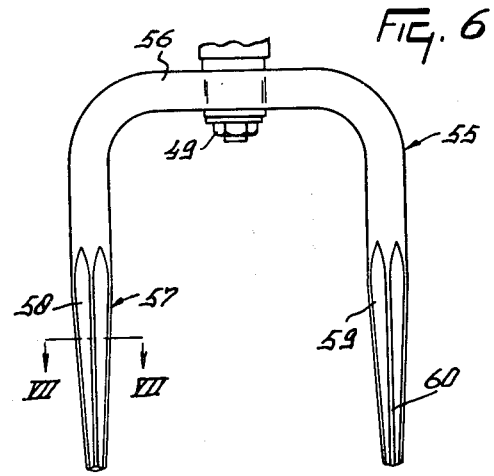

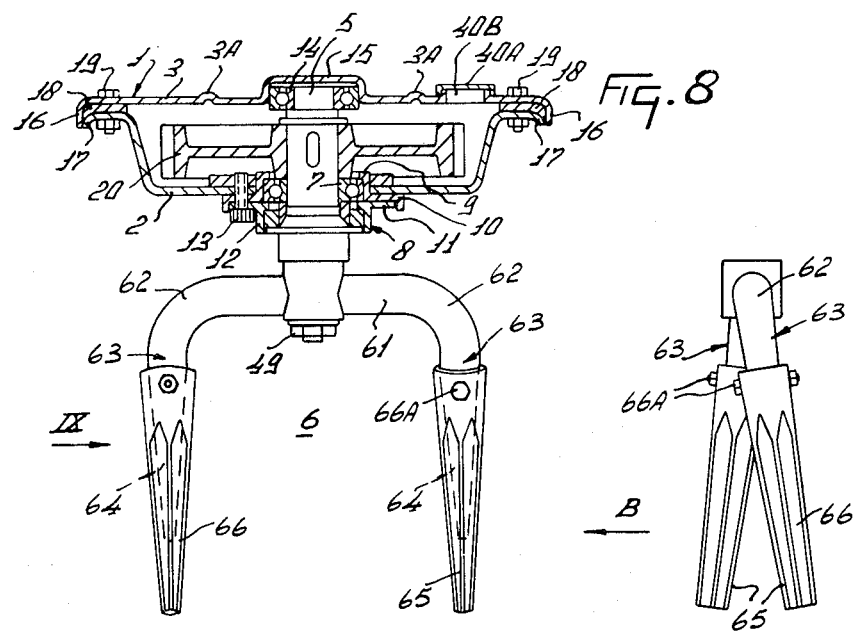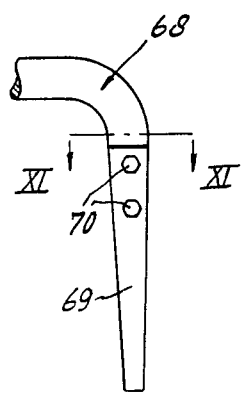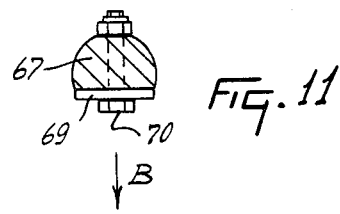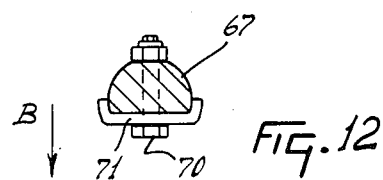

SOIL CULTIVATING IMPLEMENTS OR ROTARY HARROWS

For a better understanding of the invention, and to show how the same may be carried into effect, reference will now be made, by way of example, to the accompanying drawings, in which:

FIG. 1 is a plan view of a soil cultivating implement or rotary harrow in accordance with the invention connected to the rear of an agricultural tractor, FIG. 2 is a section, to an enlarged scale, taken on the line II—II of FIG. 1, FIG. 3 is an elevation as seen in the direction indicated by an arrow III in FIG. 2, FIG. 4 is a section, to an enlarged scale, taken on the line IV—IV of FIG. 2, FIG. 5 is a similar section to FIG. 4 but illustrates an alternative construction, FIG. 6 is a scrap elevation, similar to a lower region of FIG. 2 but illustrating an alternative embodiment, FIG. 7 is a section taken on the line VII—VII of FIG. 6, FIG. 8 is a similar view to FIG. 2 but illustrates an alternative embodiment, FIG. 9 is a view as seen in the direction indicated by an arrow IX in FIG. 8, FIG. 10 is a scrap elevation illustrating a further alternative tine construction and mounting, FIG. 11 is a section, to an enlarged scale, taken on the line XI—XI of FIG. 10, and FIG. 12 is a similar section to that of FIG. 11 but illustrates an alternative construction.

Referring to FIGS. 1 to 4 of the drawings, the soil cultivating implement or rotary harrow that is illustrated has a frame portion 1 that extends substantially horizontally transverse, and normally substantially perpendicular, to the intended direction of operative travel of the harrow which is indicated by an arrow A in FIG. 1 of the drawings. The frame portion 1 is afforded principally by a beam 2 (FIG. 2), of shallow U-shaped or channel-shaped cross-section whose limbs diverge upwardly away from its base. The upper edges of said limbs are bent over to form substantially horizontal rims 17 and at least one cover plate 3 is secured to those rims by a number of small vertically disposed bolts 19. A plurality of soil working members or rotors 6 are rotatably mounted beneath the frame portion 1 in a single row so as to be rotatable about corresponding substantially vertical, but at least upwardly extending, regularly spaced apart axes. In the particular example which is being described, there are 12 of the soil working members or rotors 6 but it is emphasised that alternative numbers thereof may equally well be provided. The axes of rotation of the soil working members or rotors 6 are afforded by corresponding substantially vertical or at least upright rotary shafts 5, said shafts 5 being mounted in lower ball bearings 7 carried in housings 8 that are received in openings or recesses in the bottom of the beam 2. Each housing 8 comprises an upper substantially horizontal portion 9 formed from sheet material that fits in the corresponding opening or recess in the beam 2, a lower substantially horizontal rim-like portion 10 and a substantially vertically bent-over circumferential lip that projects downwardly from the outermost edge of the portion 10. The lip which has just been mentioned closely surrounds a substantially horizontal rim 11 at the upper edge of a housing portion 12 that is also formed from sheet material. The housing portions 9 and 12 are secured in place, and to one another, by small substantially vertically disposed bolts 13 and, since said portions 9 and 12 are formed from sheet material, the housings 8 are of inexpensive construction and can be removed an replaced quickly and easily when access to one or more bearings 7 is required for maintenance or replacements purposes.

The upper ends of the shafts 5 are received in corresponding ball bearings 14, each bearing 14 being arranged in an individual housing 15 whose walls are integral with the cover plate 3 or corresponding cover plate 3. It can be seen from FIG. 2 of the drawings that the or each cover plate 3 is formed with rims 16 that are shaped to fit the previously mentioned rims 17 of the limbs of the beam 2, a gasket or packing 18 being interposed between the rims 16 and 17 and being maintained in position between those rims by the bolts 19. The or each cover plate 3 is formed with a pair of stiffening ribs 3A, said ribs 3A extending lengthwise of the or each plate 3 (i.e. perpendicular or transverse to the direction A) in parallel spaced apart relationship. The employment of the rims 16 and 17 and the stiffening ribs 3A gives the frame portion 1 sufficient rigidity even when sheet iron or steel or other sheet material having a thickness of less than 3 milimeters is employed. Fewer of the bolts 19 are required and a saving in weight is produced without any reduction in strength.

Each of the shafts 5 is provided, inside the hollow beam 2, with a corresponding straight- or spur-toothed pinion 20, said pinions 20 being disposed in such a way that the teeth of each pinion are in mesh with those of its neighbour, or both of its neighbours, in the single row thereof. The perpendicular distance between the longitudinal axes (axes of rotation) of neighbouring shafts 5 should not be greater than 30 centimeters and it is preferred that it should have a magnitude of substantially 25 centimeters. The opposite lateral sides or ends of the hollow beam 2 are closed by substantially vertical plates 20A to which plates further substantially sector-shaped plates 21 are fastened. Arms 22 are mounted alongside the plates 21 so as to project rearwardly beyond the plates 21 with respect to the direction A and so as to be turnable upwardly and downwardly with respect to the plates 21, and thus with respect to the frame portion 1, about substantially horizontally aligned pivots located at the tops and fronts of the plates 21 with respect to the direction A. Rearmost portions of the plates 21 with respect to the direction A have a substantially vertical extent and are formed with a plurality of holes any chosen one of which can be brought into register with a single hole in the corresponding arm 22 by turning that arm to an appropriate angular setting about the axis of its pivotal mounting at the front of the corresponding plate 21. Substantially horizontal bolts 23 are provided for entry through the single holes in the arms 22 and the chosen holes in the plates 21 to retain said arms 22 in corresponding angular settings about the substantially coincident pivotal axes of the mountings that have just been mentioned. The rearmost ends of the arms 22 with respect to the direction A carry supports 24 that project downwardly from those ends and rearwardly with respect to the direction A. A soil compressing member in the form of a ground roller 26 is rotatably mounted between the two supports 24 with the aid of horizontal bearings 25, said roller 26 comprising a central axial shaft carrying a plurality, such as nine, of substantially vertical plate-like supports 28 of substantially circular configuration that are spaced apart from one another at regular intervals. The periphery of the roller 26 is provided with a plurality, such as eighteen, of elongated elements (not shown) that are entered through holes in the supports 28 in such a way as to be turnable in those holes and readily detachably therefrom. Small transverse "safety" pins or other simple releasable fastenings may be employed for this purpose. The elements which have just been mentioned may extend parallel to the axis of rotation of the roller 26 or may be wound helically therearound to a greater or lesser extent. The elongated elements may be of tubular construction or, as an alternative, they may be of solid rod-like formation.

Shield plates that have outwardly projecting transverse, and normally perpendicular, rims 34 are arranged alongside the opposite lateral sides or ends of the row os soil working members or rotors 6 just beyond the plates 20A and 21. The shield plates are normally substantially vertically disposed and normally extend substantially parallel to the direction A. Each shield plate is fastened to a corresponding pair of arms 29 and it will be seen from FIG. 1 of the drawings that first portions of said arms 29 that are fastened to the plates bear against one another and extend substantially vertically upwards in parallel and abutting relationship with the plates concerned. The arms 29 project upwardly beyond the top edges of the shield plates for a distance and are then bent over through substantially 90° towards the center of the frame portion 1. At a distance inwardly towards that center from the bend, the two arms 29 of each pair start to diverge and the ends thereof that are remote from the shield plates are bent over to form end portions 31 with each pair of end portions 31 extending in aligned opposite directions that are substantially horizontally parallel to the direction A. The arms 29 are of tubular formation and the extremities of their end portions 31 are received turnably around stub shafts 32 that are secured to upright limbs of angular lugs 33 which have horizontal limbs that are fastened to the top or tops of the plate or plates 3 by corresponding appropriately positioned bolts 19. Each shield plate is thus turnably upwardly and downwardly about a substantially horizontal axis, extending substantially parallel to the direction A, that coincides with the aligned longitudinal axes of the corresponding pair of stub shafts 32. The hollow end portions 31 of the tubular arms 29 that turnably receive the stub shafts 32 constitute very simple and inexpensive bearings for the pivotably mounted shield plates.

The rim 34 of each shield plate includes, along the lowermost edge of the corresponding shield plate, a ground-engaging portion whose rearmost end terminates in an upwardly, and rearwardly with respect to the direction A, inclined portion and whose leading end terminates in an upwardly, and forwardly with respect to the direction A, inclined portion, the last-mentioned portion being inclined to the horizontal at a smaller angle than the portion at the rear end of the ground-engaging portion. The bottom of each ground-engaging portion is provided with a corresponding rib or runner, said rib or runner being substantially coplanar with the corresponding shield plate and having leading and rearmost end regions that are bent over to match the portions of the rim that have just been described and that lies at opposite ends of the ground-engaging portion of that rim 34. The provision of the ribs or runners enables the shield plates to slide over the ground surface during the operation of the harrow in relatively stable positions and brings wear upon the lowermost edges of said plates and the ground-engaging portions of their rims 34 to a minimum. The ribs or runners are releasably secured to the rims 34 to enable them to be replaced when this eventually becomes necessary after inevitable wear has occurred.

The soil working members or rotors 6 are rotated, during the use of the implement or harrow, by a drive transmission which includes parts contained within a gear box 37 that is located, when the implement or harrow is viewed from the rear in the direction A, slightly to the left of the center of the frame portion 1 above the sixth soil working member or rotor 6 counting from the left-hand end of the single row thereof under the conditions just mentioned. A substantially horizontal plate 38 is arranged on top of the cover plate or plates 3 and is provided with an upright rim 39 which substantially surrounds the gear box 37. Owing to the provision of the rim 39, the plate 38 may be formed from thinner material than would otherwise be necessary so that there is a saving in weight and the shaping of the plate 38 is facilitated. The shaft 5 that corresponds to the soil working member or rotor 6 above which the gear box 37 is mounted is extended upwardly into that gear box, the extension carrying a bevel pinion whose teeth are in mesh with those of a further bevel pinion carried by a shaft (not visible) that extends substantially horizontally parallel to the direction A. The rearmost end of the shaft which has just been mentioned extends into a change-speed gear 37A by which it can be connected to a further overlying and parallel substantially horizontal shaft 40 by alternative toothed pinions that can give a number, such as four, of different transmission ratios depending upon their relative arrangement. It is not necessary to describe the construction and arrangement of the change-speed gear 37A in further detail for the purposes of the present invention. As can be seen in FIG. 1 of the drawings, the leading end of the upper substantially horizontal shaft 40 that extends substantially parallel to the direction A projects from the front of the gear box 37 where it is splined or otherwise keyed to enable it to be placed in driven connection with the power takeoff shaft of an agricultural tractor or other operating vehicle by means of an intermediate telescopic transmission shaft of a construction that is known per se having universal joints at its opposite ends. The change-speed gear 37A is adjusted to give a speed of revolution of the soil working members or rotors 6 in response to a more or less constant speed of rotation of the power take-off shaft of the operating tractor or other vehicle that is appropriate to the particular operation that is to be carried out, the nature of the soil that is to be worked and factors such as the moisture content of the soil. The cover plate 3, or one of the cover plates 3, is formed with a lubricant filling opening 40B, said opening being provided with a removable cap or plug 40A formed from a synthetic plastics material. In the operation of the soil cultivating implement or rotary harrow, the hollow interior of the beam 2 is partially filled with oil so that the pinions 20 are substantially constantly immersed in an oil bath.

The front of the frame portion 1 with respect to the direction A has a coupling member or trestle 41 of generally triangular configuration secured to it, said coupling member or trestle being employed in connecting the frame portion 1 to the three-point lifting device or hitch at the rear of an operating agricultural tractor or other vehicle. The coupling member or trestle 41 is provided, at substantially the same level as the frame portion 1, with two pairs of substantially vertical plates 42 which are formed at their fronts with respect to the direction A with substantially vertical slots. A substantially horizontal rod 44 that extends perpendicular, or at least transverse, to the direction A is entered through all four of the slots and the opposite ends of said rod that project beyond the furthest remote plates 42 constitute coupling points to which the free ends of the lower lifting links of the three-point lifting device or hitch of an operating agricultural tractor or other vehicle are pivotally connected in the manner shown in outlined in FIG. 1 of the drawings. The apex of the coupling member or trestle 41 is provided with a pair of substantially vertical plates 45 that both extend substantially parallel to the direction A in closely spaced apart relationship. As shown in FIG. 1 of the drawings, the free end of the upper adjustable lifting link of the three-point lifting device or hitch of the operating agricultural tractor or other vehicle is pivotally mounted between the two plates 45. Rear regions of the two plates 45 with respect to the direction A are coupled to the upper ends of two tie rods 46 that diverge downwardly, and rearwardly with respect to the direction A, away from said plates 45, the lowermost and rearmost ends of said tie rods 46 being fastened to strengthening beams 47 that extend substantially horizontally parallel to the direction A on top of the cover plate or plates 3. The leading ends of the beams 47 are connected to substantially vertical plates sandwiched between the two pairs of similarly disposed plates 42. A box 48 that may conveniently store tools, spare parts and the like is located at one side of the gear box 37 on top of the plate or plates 3 and between the strengthening beams 47, said box 48 preferably being provided with a pivotable lid that can be retained closed in the simple manner which can be seen in outline in FIG. 1 of the drawings.

The lowermost end of each shaft 5 that projects from beneath the frame portion 1 is splined or otherwise keyed and has a lowermost screwthreaded extremity. Corresponding arcuately curved tine supports 50 (FIGS. 2 and 3) that are integral with pairs of tines 51 are formed with central matchingly splined or otherwise keyed holes and are fastened to said ends of the shafts 5 by entering those ends through the holes which have just been mentioned and maintaining the connections with the aid of nuts 49 that co-operate with the screwthreads referred to above. The two tines 51 extend downwardly away from the support 50 with which they are integral, both of them being substantially, but not exactly, parallel to the axis of rotation afforded by the corresponding shaft 5. Each support 50 and the corresponding pair of tines 51 are forged or cast from a single length of material, the shape being such that, as can be seen in FIG. 3 of the drawings, at least the lower straight active or soil working portions 52 of the tines 51 are inclined rearwardly by a few degrees so as to trail with respect to the intended direction of rotation B of the soil working member or rotor 6 concerned. It should be noted that, in FIG. 3 of the drawings, the arrow B relates to the tine 51 that is closest to a viewer of the Figure. Each tine 51 comprises an upper portion of right-circular cylindrical configuration that merges into the corresponding support 50 and whose lower end merges into the corresponding active or soil working portion 52 which is of substantially circular cross-section and which tapers progressively in a downward direction towards its free end or tip. The front of each active or soil working portion 52 with respect to the intended direction of rotation B is provided with a hardened steel. The element 53 is of substantially triangular cross-section and is received in a longitudinal extending groove whose cross-section matches that of part of the element 53. Each element 53 extends throughout substantially the whole of the length of the corresponding active or soil working portion 52. FIG. 5 of the drawings illustrates a construction, which may otherwise be similar to that of FIGS. 2 to 4 inclusive, in which a hardened element 54 of substantially semi-circular cross-section has its curved side, which is rearmost with respect to the direction B, received in a matchingly shaped groove at the front of the active or soil working portion 52 concerned. The element 54 may be retained in the groove by welding or by employing an epoxy resin adhesive or the like.

FIGS. 6 and 7 of the drawings illustrate an embodiment in which each soil working member or rotor 6 comprises a support 55 which includes a substantially horizontally extending portion 56 formed at its opposite ends with two substantially 90° downward bends whose lowermost ends merge integrally into corresponding tines 57. Each support 55 and the corresponding pair of tines 57 are formed from a single length of material by forging, casting or swaging. Each tine 57 includes an active or soil working portion 58 that tapers progressively in a downward direction towards its lowermost free end or tip. Each such portion 58 is of polygonal, and preferably rectangular, cross-section and, as can be seen in FIG. 7 of the drawings, is flattened to some extent towards its lowermost free end or tip in such a way that, as seen in cross-section with the preferred rectangular configuration, diagonals taken between pairs of opposite corners are of different magnitudes, the diameter of greater magnitude extending substantially tangentially with respect to a circle centered upon the corresponding axis of rotation. Longitudinally extending hollow grooves 59 are formed in the what would otherwise be flat sides of the active or soil working portions 58 throughout substantially the whole of the length of each such portion and it will be noted that, at the front of each portion 58 with respect to the direction B, that portion is provided with a hardened element in the form of a hardened layer or rib 60 of the material of the remainder of the corresponding tine 57.

FIGS. 8 and 9 of the drawings illustrate a construction in which each soil working member of rotor 6 includes a substantially horizontally extending support 61 whose opposite ends merge integrally, by way of downwardly directed bends 62 having magnitudes of substantially 90°, into corresponding tines 63. Each support 61 and its tines 63 are made integrally by casting single lengths of steel and each such unit has an inverted channel-shaped or U-shaped configuration. The supports 61 and the upper ends of the tines 63 are of circular cross-section but the tines have lower downwardly tapering active or soil working portions 64, said portions 64 extending substantially, but not exactly, parallel to one another and to the corresponding axis of rotation (see FIG. 9). Each tine 63, or at least the active or soil working portion 64 thereof, is inclined rearwardly by a few degrees so as to trail to some extent with respect to the intended direction of rotation B of the soil working member or rotor 6 concerned. The arrow B shown in FIG. 9 of the drawings relates to the tine 63 that is closest to the viewer of that Figure. Each of the active or soil working portions 64 is provided with a separate wear-resistant element 65 that substantially completely surrounds the portion 64 concerned. Each element 65 is of tapering socket-like configuration, the corresponding downwardly tapering active or soil working tine portion 64 being received internally therein. The connection is maintained by a transverse bolt 66A that is entered through registering holes in the walls of the element 65 near its upper end and through a transverse bore in the corresponding tine 63. The external surface of each wear-resistant element 65 is of polygonal, and preferably rectangular, configuration and has a construction which is generally similar to that already described with reference to FIGS. 6 and 7 of the drawings. The progressive flattening of the elements 65 towards their lowermost free ends or tips can be seen from a comparison of FIGS. 8 and 9 of the drawings, the otherwise flat sides of each element 65 being formed with concave or at least hollow grooves 66 that are similar to the previously described grooves 59.

FIGS. 10 and 11 of the drawings illustrate a further alternative embodiment in which tines 68, that are integral with their supports, have active or soil working portions 67 that are provided at their fronts, with respect to the direction B, with wear-resistant elements 69 of strip-like formation. The strip-like elements 69 taper downwardly at the fronts of the active or soil working portions 67 of the tines 68 to match the downward taper of those tine portions. An upper end region of each element 69 is secured to the corresponding tine portion 67 by two transverse bolts 70 that are disposed in vertically spaced apart relationship. FIG. 12 of the drawings illustrates an alternative construction, which is otherwise similar to the construction of FIGS. 10 and 11 of the drawings, in which strip-like wear-resistant elements 71 are employed in place of the elements 69, said elements 71 being of shallow channel-shaped cross-section with the flanges thereof bent over rearwardly with respect to the direction B around leading regions of the opposite sides of the active or soil working tine portions 67. An even better degree of protection against wear of the tine portions 67 is thus obtained.

In the use of the soil cultivating implement or rotary harrow that has been described when equipped with any of the tines and tine mounting arrangements that have also been described, the coupling member or trestle 41 is connected to the three-point lifting device or hitch of an operating tractor or other vehicle and the leading end of the shaft 40 is placed in driven connection with the power take-off shaft of the same tractor or other vehicle by way of an intermediate telescopic transmission shaft of a construction that is known per se having universal joints at its opposite ends. Upon operative travel over a field, the drive that is imparted to the shaft 40 causes the soil working members or rotors 6 to revolve in the directions B that are shown in FIG. 1 of the drawings. The perpendicular distance between the lowermost free ends or tips of the two tines of each member or rotor 6 is slightly greater than the perpendicular distance between the axes of rotation of immediately neighbouring shafts 5 so that the individual strips of soil that are worked by the various members or rotors 6 overlap to produce, in effect, a single broad strip of worked soil. The working depth of the tines is controlled by engaging the previously mentioned bolts in appropriate holes in the plates 21. This governs the level of the axis of rotation of the roller 26 with respect to the remainder of the implement or harrow and consequently controls the maximum depth to which the tines can penetrate into the soil.

The various constructions that have been described and that are illustrated in the accompanying drawings provide reliable combinations of tines and supports therefor, said combinations being made quite simply by using cast steel and/or by forging or swaging, separate fastening means for the tines being rendered unnecessary. The tines are, of course, subject to inevitable wear but the provision of the hardened wear-resistant elements around or on the active or soil working portions thereof considerably lengthens the lifetime of the tines, particularly when, as with several of the embodiments, said elements can be replaced without replacing the tines themselves. It will be noted that, in each of the constructions that has been described and illustrated, the active or soil working portion of each tine is straight throughout all or most of its length and that such portion has a length which is equal, or substantially equal, to the length of the corresponding tine support.

Although various features of the soil cultivating implement or harrow and tines and tine mountings that have been described and/or illustrated in the accompanying drawings will be set forth in the following claims as inventive features, it is emphasised that the invention is not necessarily limited to those features and that it includes within its scope very part of the soil cultivating implement or rotary harrow and each tine and tine mounting that has been described and/or illustrated both individually and in various combinations.

I claim:

1. A rotary harrow comprising frame means, said frame means including a frame portion that supports side-by-side rotatable soil-working members, each of said soil-working members including a tine support and a tine at each end of said support, said soil-working members being mounted in a row that extends transverse to the normal direction of travel, said two tines and support of each soil-working member being rotatable about an upwardly extending shaft and means securing said support to the lower portion of said shaft, said two tines and support being formed from a single piece of material, said support being provided with a hole located between said tines and the end of said shaft being entered in said hole and detachably held in said hole by connection means, each tine having a soil-working portion that is substantially straight throughout its length, and the upper portion of that soil-working portion having a substantially circular cross-section which tapers progressively in a downward direction to a polygonal cross-section towards the tip of the tine, said cross-section being substantially rectangular with corners, said cross-section adjacent said tip forming diagonals of different lengths between pairs of opposite corners.

2. An implement as claimed in claim 1, wherein said two tines extend substantially parallel to said shaft and their soil-working portions trail with respect to the direction of rotation of the corresponding soil-working member during operation.

3. An implement as claimed in claim 1, wherein longitudinally extending grooves are formed between said corners along the length of the soil-working portion, below said circular cross-section.
4. An implement as claimed in claim 1, wherein a longer diagonal extends substantially tangentially with respect to a circle centered upon said shaft.

* * * * *